(12) United States Patent
Ekladyous et al.

(10) Patent No.: US 8,582,091 B2
(45) Date of Patent: Nov. 12, 2013

(54) VISION-BASED HEADLAMP AIMING

(75) Inventors: Albert Ekladyous, Shelby Township, MI (US); Kevin William Kiedaisch, Brownstown, MI (US); Arun Kumar, Farmington Hills, MI (US); Thomas William Partch, Trenton, MI (US); John Wesley Wilds, Trenton, MI (US); Candace Carolyn Glasgow, Canton, MI (US); Sleiman Abdelnour, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 250 days.

(21) Appl. No.: 13/223,329

(22) Filed: Sep. 1, 2011

(65) Prior Publication Data

US 2013/0058111 A1    Mar. 7, 2013

(51) Int. Cl.
*G01J 1/00*           (2006.01)
(52) U.S. Cl.
USPC .......................................................... 356/121
(58) Field of Classification Search
USPC .......................................................... 356/121
See application file for complete search history.

(56) References Cited

U.S. PATENT DOCUMENTS

| | | | | |
|---|---|---|---|---|
| 5,078,490 | A * | 1/1992 | Oldweiler et al. | 356/121 |
| 5,379,104 | A * | 1/1995 | Takao | 356/121 |
| 5,392,111 | A * | 2/1995 | Murata et al. | 356/121 |
| 5,504,574 | A * | 4/1996 | Murata | 356/121 |
| 5,619,322 | A * | 4/1997 | Murata et al. | 356/121 |
| 5,751,832 | A * | 5/1998 | Panter et al. | 382/104 |
| 6,611,610 | B1 * | 8/2003 | Stam et al. | 382/104 |
| 6,906,467 | B2 * | 6/2005 | Stam et al. | 315/82 |
| 6,924,470 | B2 * | 8/2005 | Bechtel et al. | 250/208.1 |
| 7,149,613 | B2 * | 12/2006 | Stam et al. | 701/36 |
| 7,241,034 | B2 * | 7/2007 | Smith et al. | 362/465 |
| 7,302,326 | B2 * | 11/2007 | Stam et al. | 701/36 |
| 7,576,505 | B2 * | 8/2009 | Chen | 318/466 |
| 7,653,215 | B2 * | 1/2010 | Stam | 382/104 |
| 7,876,427 | B1 * | 1/2011 | Melvin | 356/121 |
| 8,004,663 | B1 * | 8/2011 | Melvin | 356/121 |
| 8,422,004 | B1 * | 4/2013 | Ekladyous et al. | 356/121 |

* cited by examiner

*Primary Examiner* — Roy M Punnoose
(74) *Attorney, Agent, or Firm* — Joseph E. Root

(57) ABSTRACT

A method for accurately aiming vehicle headlamps, with apparatus for practicing the method. A vision system, including a digital camera, is positioned in front of a headlamp, in communication with a control device. The control device employs pattern recognition to identify the optical axis indicia within the headlamp, and based on the identified location of that indicia, the control system accurately aligns a beamsetter with the optical axis of the headlamp.

9 Claims, 5 Drawing Sheets

VISION-BASED HEADLAMP AIMING

TECHNICAL FIELD

This application relates generally to vehicle headlamps, and more particularly, to headlamp aiming systems.

BACKGROUND

Motor vehicles generally use headlamps to illuminate the road during low visibility conditions. In the past, vehicle generally employed two headlamps, one on either side, mounted at the front of the vehicle. Recent years have seen a proliferation of multiple headlamp systems, however, and many vehicles now feature at least two headlamps on each side. Each headlamp, or each pair of headlamps, offers two illumination conditions, referred to as high beam and low beam. The high beam setting offers maximum illumination, as the beams are aimed generally straight ahead of the vehicle. If oncoming traffic is present, however, high beams will impair the visibility of approaching drivers, and therefore a low beam setting is available, in which the headlight beams are directed relatively downward. Most countries, including the United States, ensure safety through regulations specifying the light patterns produced by mounted headlamps. In general, a vehicle under test is positioned in a stated position relative to a test surface, the headlamps are illuminated, and the resulting light pattern is analyzed. Headlamp mounting arrangements include an aiming adjustment mechanism, which typically shifts the orientation of the headlamp beam on horizontal and vertical axes, and that mechanism is used to aim the beams as required. A target or pattern on the projecting surface assists the aiming process, also referred to as aiming the headlamps.

Headlamps are initially aimed during manufacture, and that process must occur smoothly and rapidly. Typically, the vehicle assembly line includes a headlamp aiming station where that task is performed. It can be readily understood that headlamp aiming criteria vary with vehicle height, width, and other factors related to vehicle make, model, and build. Manufacturers have attempted to streamline the headlamp aiming process by identifying individual automobiles with a given build specification. In practice, these measures have not been noticeably successful, as it has been found that even small variations, particularly in height, have cause significant variation in results, causing undesirable cost and effort. A need therefore remains for headlamp aiming equipment and processes that allow flexible aiming over a range of vehicle types.

SUMMARY

One aspect of the disclosure sets out a method for aiming a vehicle headlamp. Initially, a vision system is placed in front of the headlamp under test, and that system identifies the optical axis indicia within the headlamp. That information allows the precise height of the headlamp's optical axis to be determined. A beamsetter can then be accurately positioned so that the optical axis of the headlamp falls within the optical system of the beamsetter. The system can then proceed to aim the headlamp accurately. In a fully automatic embodiment of this disclosure, the system completely aims all headlamps on a vehicle without operator intervention. Manual systems can perform one or more steps using operators.

Another aspect of the disclosure is a system for aiming a vehicle headlamp. The system includes a control system, which can be a computing device, either a standalone computer or integrated into a business unit or enterprise computing system. A vision system includes a camera in communication with the control system, so that camera data can be fed to pattern recognition software for processing, allowing the control system to identify the optical axis indicia within the headlamp. Identifying the headlamp's tops optical axis indicia establishes the location of the headlamp optical axis, including its height. That data can be employed to position a beamsetter accurately in front of the headlamp. In a fully automated system, means can be provided for completely aiming the vehicle headlamps without operator intervention.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes a method and system for vision-based vehicle headlamp aiming. The system provides for accurate aiming of vehicle headlamps by first determining the actual height of the headlamp axis. Initially, a vision system is positioned in front of the headlamp under test, and that system communicates with a control system. A digital camera within the vision system scans the headlamp and feeds data to the control system, where pattern recognition software analyzes the signal to identify the location of the optical axis indicia within the headlamp. Once the application is determined, the system can calculate the exact position of the vehicle headlamp's optical axis and, and with that information, the system can align a beamsetter's optical system with the headlamp's optical axis. At that point, the system can accurately aim the headlamp.

Conventional Systems

Figure 1A:
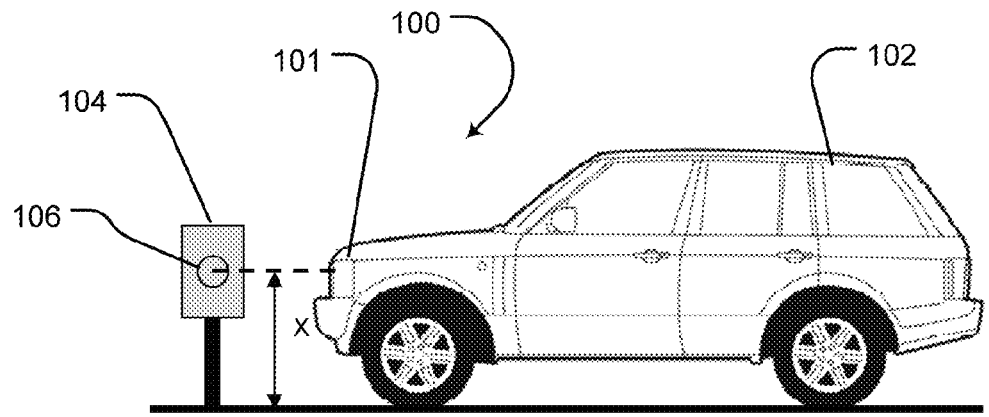
FIGS. 1A-1C depict a conventional headlamp aiming system.

A conventional headlamp aiming system 100 is shown in FIG. 1A. There, a vehicle 102, having headlamps 101, is positioned a desired distance in front of a beamsetter 104. Beamsetters, also referred to as photometric aimers, have generally replaced adjustment methods that depended on shining headlights against a test surface, particularly in applications that require efficient operation, such as automobile manufacture. Typical beamsetters are readily available in the art, such as the Vision 100 Optical Headlight Aimer, supplied by Wall Industries, LLC, of Emporia Kans. Once the vehicle 102 is positioned in front of the beamsetter 104, the beamsetter height X is adjusted so that the headlamp shines directly into the beamsetter optical system 106. The operator can then adjust the headlamp aiming based on feedback from the beamsetter 104.

Figure 1B:
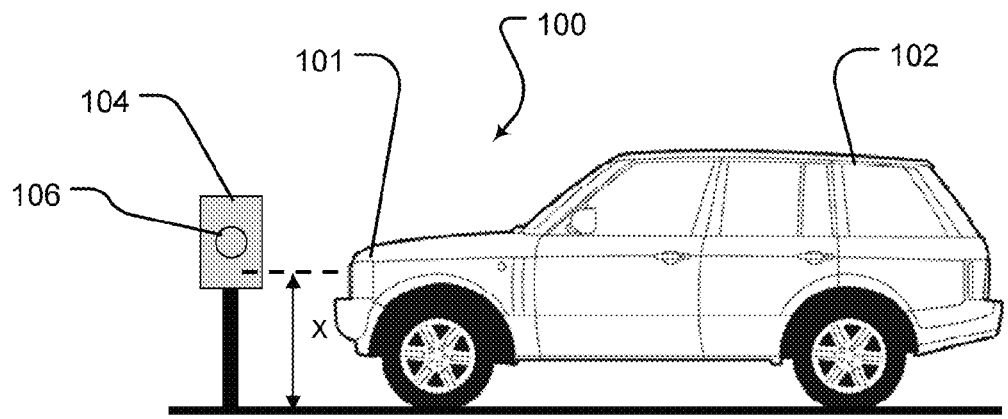
Figure 1C:
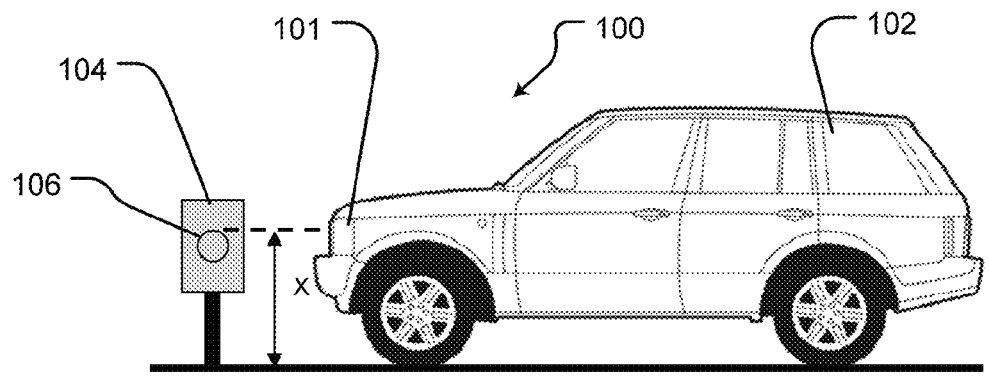

A drawback of the beamsetter technology, however, is the requirement that the beamsetter be exactly aligned with the headlamp under test. In an automobile manufacturing environment, if all vehicles were identical, position markers could be employed to allow each vehicle to be perfectly positioned. Manufacturers have long used "build" specifications to standardize as many vehicle manufacturing factors as possible. Unfortunately, however, vehicles differ even within particular manufacturing build types, resulting in sufficient difference in height so that some vehicles will be below the height standard, as shown in FIG. 1B, and others will be above that standard, shown in FIG. 1C. In either of those situations, the headlamp beams will fail to shine directly into the beamsetter 104 optical system 106, requiring time-consuming set up activities to perform headlamp aiming.

Exemplary Embodiments

Figure 2:
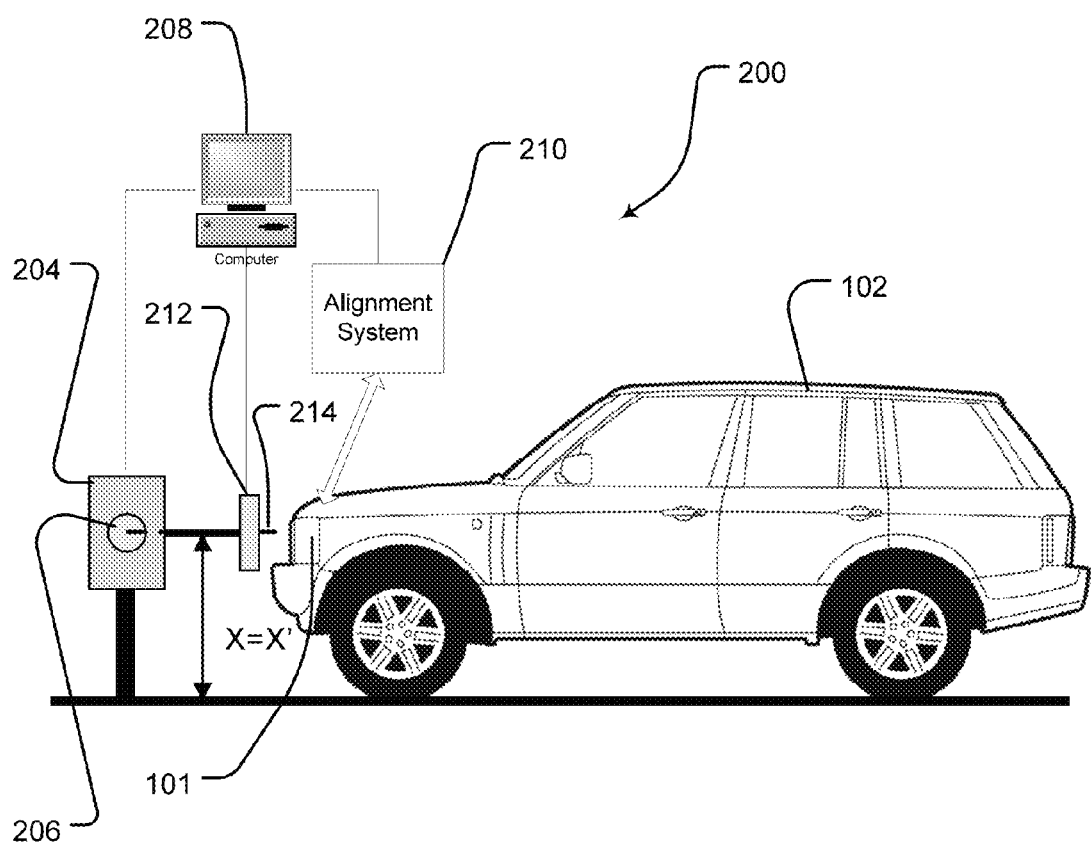
FIG. 2 illustrates an embodiment of the present disclosure, in the form of a vision-based headlamp aiming system.

A vision-based headlamp aiming system is illustrated in FIG. 2. The major components of that system are a beamsetter 204, a control system 208, an aiming system 210, and a vision system 212. These devices all cooperate to aim the headlamps 101 of an automobile 102. At the outset, it will be recognized that the present disclosure applies to any vehicle that employs headlamps, and particularly any vehicle subject to headlamp illumination regulations. Thus, alternative embodiments of the present disclosure could well be used on close variants of the depicted automobile, such as pickup trucks, semi-trailer trucks and other commercial vehicles, as well as more distant relations such as snowmobiles.

Beamsetter 204 is similar to the conventional beamsetter systems discussed above. Primarily, this device must accept a headlight beam as input into its optical system 206, and it must output feedback that will allow an operator or a control system to aim the headlight beam. Although no commercial devices offer the range of automated features discussed here, those in the art will understand the modification requirements discussed below, and implementing those modifications, lies well within the skill of those in the art. In the illustrated embodiment, it was found useful to employ a modified version of a HBS97A headlamp beamsetter system, available from Sealey.

In the conventional system discussed above, that beamsetter provided output in the form of aiming values, which an operator then manually applied to the headlamps under test. Here, beamsetter 204 is linked to control system 208, and it outputs aiming data to that system. Control system 208 can be any computing device capable of performing the calculation and control functions set out below. In one implementation, control system 208 takes the form of a standalone computer, which could be either a laptop or desktop system. Other embodiments implement the controlling function on a department or enterprise-level computer, or even a manufacturing control system. Beamsetter 204 can communicate with control system 208 using suitable conventional means, which could employ wired Ethernet technology or a wireless system, as desired. In the illustrated embodiment, control system 208 is a known personal computer system, communicating with beamsetter 204 by means of Ethernet LAN technology.

The actions performed by control system 208 including accepting aiming data from beamsetter 204 as input, processing those data to arrive at control signals, and outputting control signals. The exact form of the input and output data will depend upon the exact configuration of beamsetter 204, along with requirements of the output system. As for the algorithms required to make the required data conversions, those of skill in the art can employ known techniques to effect those functions. It will be further understood that control system 208 will be called upon to perform various administrative and housekeeping functions, such as logging and storing data, compiling reports, and the like.

An aiming system 210 receives aiming signals from control system 208 and converts those signals into mechanical outputs and physically aim headlamps 101. The system could be, for example, a robotic device that receives aiming signals and responds by performing mechanical actions, such as rotating one or more aiming screws (not shown). It should also be understood, that the aiming system 210 can be represented by a human operator who receive signals in human-readable form, such as output on a display device associated with control system 208, and responds by performing appropriate aiming actions. It should be apparent that this system can take a number of forms within the scope of this disclosure.

Figure 3:
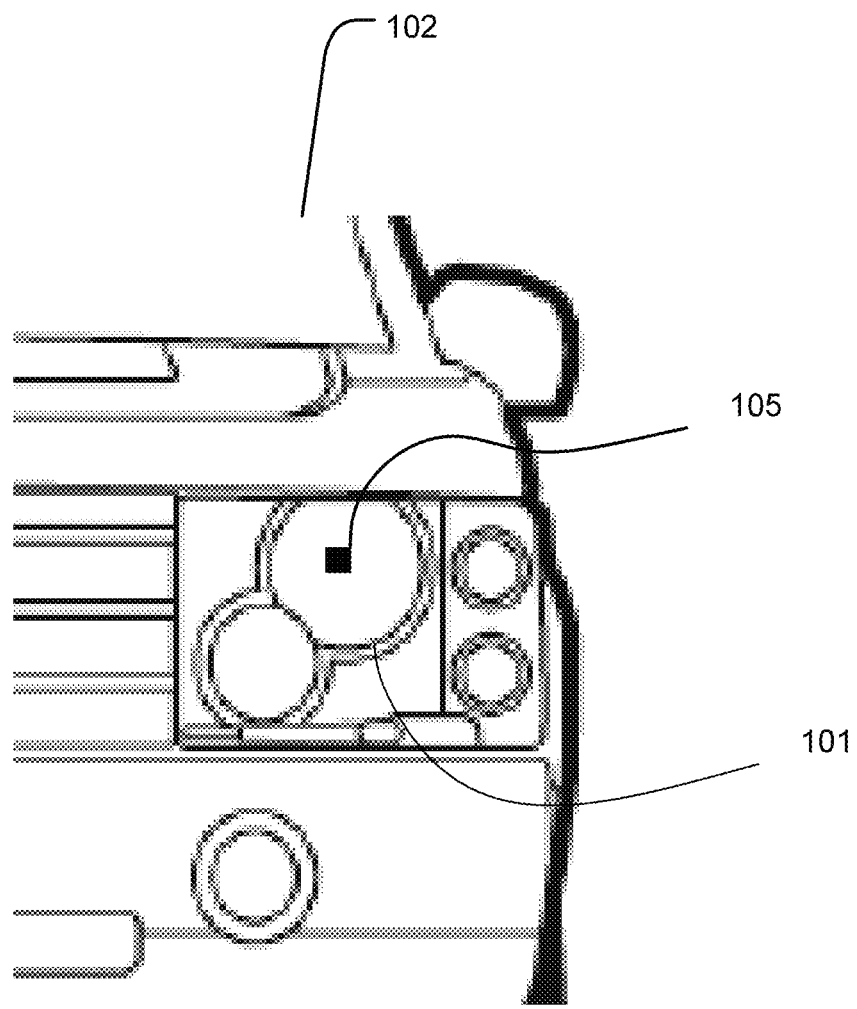
FIG. 3 is a partial front view of a vehicle under test.

Vision system 212 allows the remainder of the system to function smoothly and rapidly by performing an initial aiming of the headlamps 101 with the beamsetter optical system 206. This system includes of a digital camera 214, and the system communicates and cooperates with pattern recognition software in control system 208. Positioning and mounting of vision system 112 is discussed in more detail below. FIG. 3 shows a close-up of the headlamp area of an automobile 102. As seen, and indicia 105 is formed within headlamp 101. Details are set out below, but it should be noted here that indicia 105 is located at a known position within a headlamp 101, and control system 208 causes digital camera 214 to scan the general area of headlamp 101 until the pattern recognition software identifies indicia 105. Depending on the exact type of lamp, the indicia may be on the outer lens, or on the lens of an internal projector. Once that location is identified, control system 208 can position beamsetter 204 so that headlamp 101 aims directly at the beamsetter optical system 206. Stepper motors or other conventional positioning means can be employed for that purpose, as will be evident to those in the art.

Digital camera 214 and associated components of the vision system 212, such as the pattern recognition software, can be selected from suitable devices known and available in the art. For example, one suitable digital camera could be Prosilica GB camera commercially available from Allied Vision Technologies, and a pattern recognition software system that has been found effective is XG 7000 series from Keyence.

Motor vehicles normally carry headlamps on both sides of the vehicle, and one approach for aiming headlamps on both sides of an automobile is shown in FIG. 3. There, beamsetter 204 is carried on track 216, which extends across the front of automobile 102. Beamsetter 204 is mounted on track 216 by appropriate means, and equipped for either controlled movement, employing known devices such as stepper motors, or manual movement. Vision system 112 is mounted adjacent to beamsetter 204 and moves with it. In the illustrated embodiment, vision system 112 is carried to one side of beamsetter 204, but that configuration may be altered as desired.

Control system 108 moves the beamsetter 204/vision system 212 combination sequentially through four positions. First, vision system 212 moves in front of headlamp 101 to determine and record the location of indicia 105 (position not shown). With the correct position of headlamp 101 in the system, beamsetter 204 moves in front of headlamp 101 to perform aiming. That configuration is shown in solid lines in FIG. 3. After headlamp 101 is aimed, control system 108 positions vision system 212 in front of the other headlamp 101' to locate the indicia on that headlamp (position not shown). That operation is followed by moving the elements to the positions indicated as beamsetter 204' and vision system 212', shown in phantom in FIG. 3.

As is known in the art, the settings for right hand side (RHS) headlamps differ from those applied to a left hand side (LHS) headlamp. The present system allows those differences to be integrated into control system 208, allowing headlamps to be correctly and independently aimed. Conventional systems often preceded by attempting to aim one headlamp, and then aiming the second headlamp with reference to the first. Clearly, that system propagates and magnifies any errors from the first aiming into the second. Here, all headlamps are independently aimed, producing a superior aiming result.

Numerous alternatives are available to accomplish the task of aiming all headlamps on a motor vehicle. At the outset, it should be noted that the positioning sequence described above assumes that only one of the headlamps need be fully aimed. In systems where pairs of headlamps require aiming, the positioning steps can be repeated as many times as required. Also, the automated system described above could be performed either partially or fully by manual operation. For example, rather than having control system 208 move elements down the track 216, that movement could be accomplished by an operator physically rolling the device, either on a track or otherwise. Alternatively, an aiming station could be set up having dual beamsetters 204 and vision systems 212.

Figure 5:
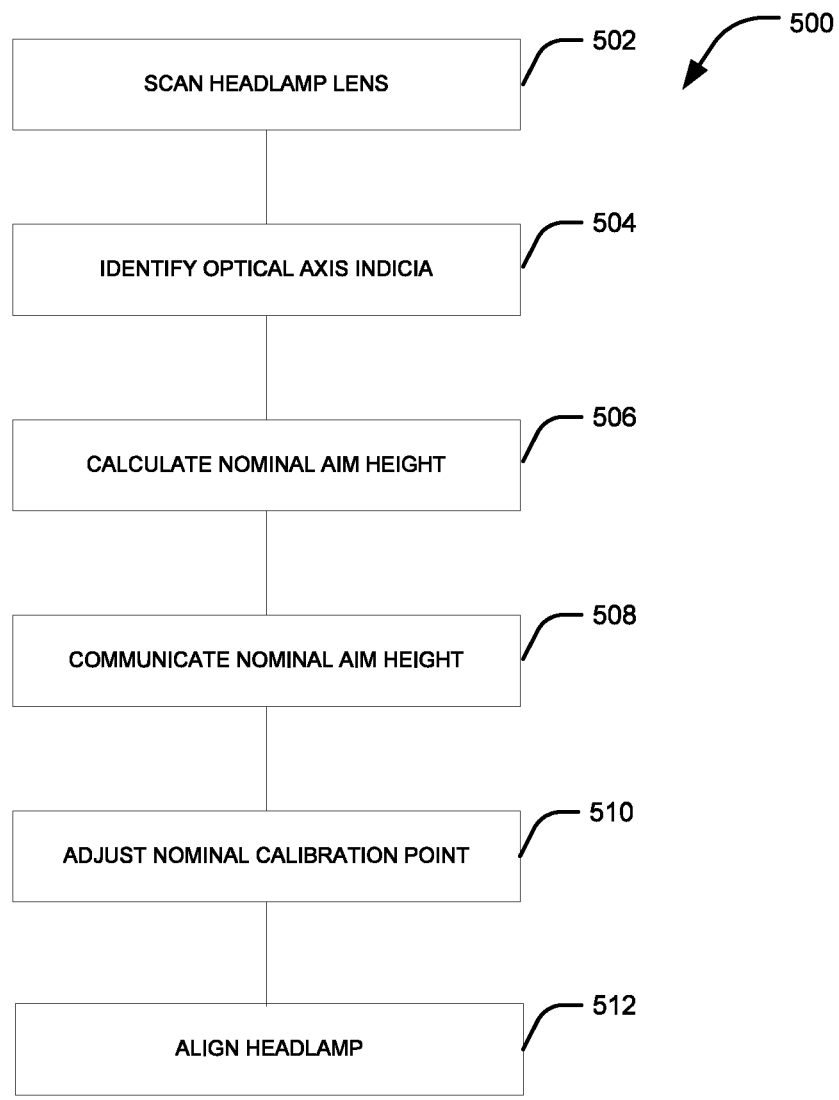
FIG. 5 is a flowchart depicting an exemplary embodiment of a vision-based headlamp aiming method.

FIG. 5 is a flowchart depicting an embodiment of a process 500 for aiming an individual headlamp. As should be clear from the description above, the process 500 would be carried out separately for each headlamp requiring aiming. Before starting the process shown here, a vehicle 102 would be positioned in front of aiming system 200, generally utilizing positioning marks. Once the vehicle 102 is in position, one or more headlamps 101 can be illuminated and the test begun. The discussion of FIG. 5 refers to apparatus shown in previous drawings.

The process begins at step 502 by scanning the chosen headlamp lens. This step is accomplished by a vision system, such as vision system 212, employing a scanning device such as digital camera 214. As it scans the headlamp lens, digital camera 214 sends signals to a device such as control system 208, where pattern recognition software analyzes the signals.

Figure 4:
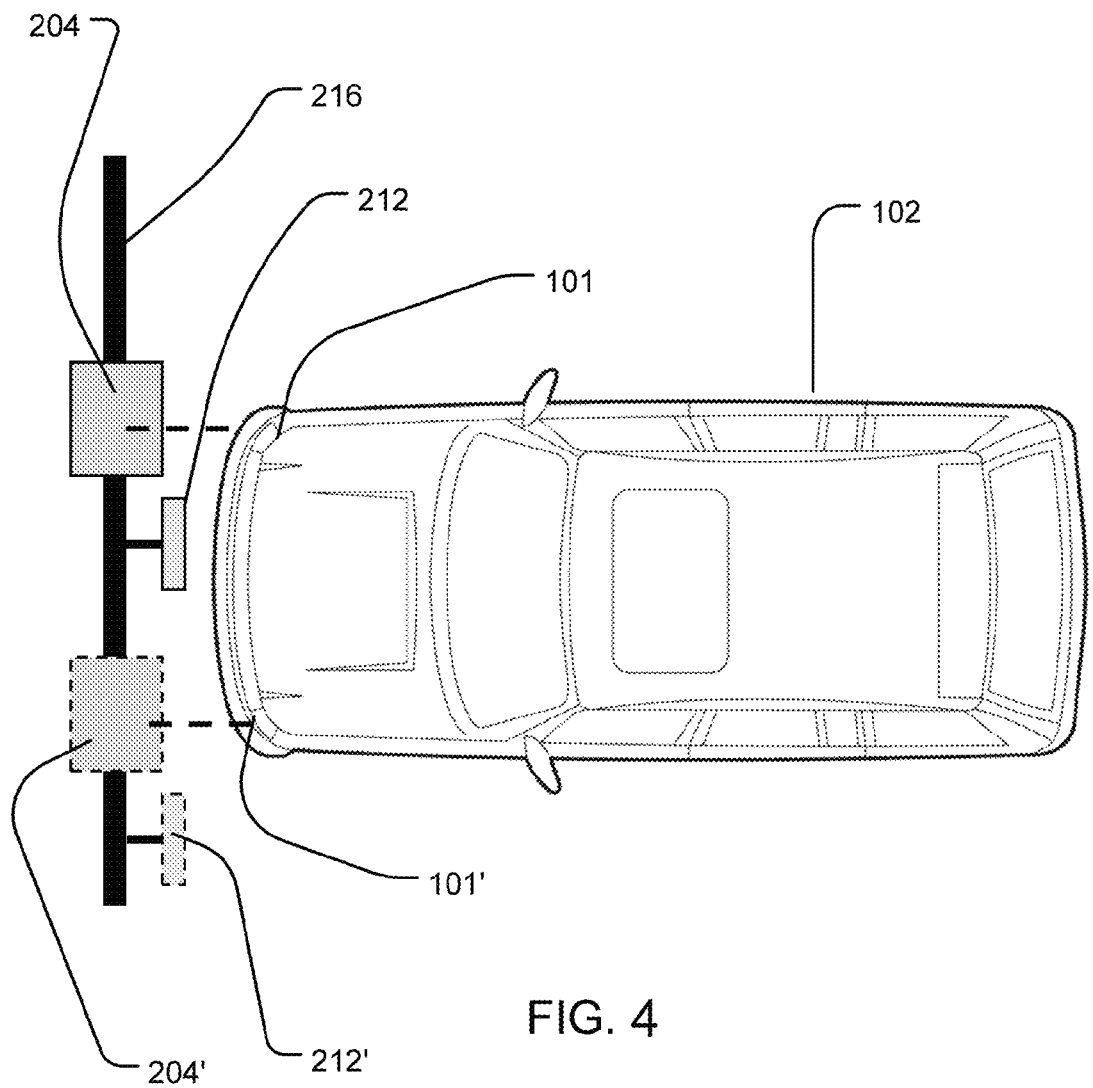
FIG. 4 is a plan view of a vehicle under test, illustrating alternate positions of the beamsetter.

Success at step 502 is achieved when the vision system identifies the optical axis of the headlamp by identifying a pattern such as indicia 105 carried within the headlamp 101. Once the headlamp's optical axis is identified, exact coordinates for positioning the beamsetter 204 can be calculated, a process completed at step 506. While a fully automated system, such as that shown in FIG. 4, requires precise location of a headlamp axis, both in terms of height and position along the track, manual or semi-manual systems might not require that much data. What will generally be required at a minimum, however, will be the nominal aim height, identifying the distance from the test location floor to the center of the headlamp beam.

Vision system 212 then communicates the headlamp beam signal location information in step 508. In a fully automated system, that communication could go to the control system, such as control system 208. A more minimal system would be configured to communicate that information directly from vision system 212 to beamsetter 204. A purely manual system might be configured to simply output information in a human-readable form, such as a dial or an LED indicator, and an operator would then enter that information into beamsetter 204.

Movement data are calculated at control system 208, and beamsetter 204 is brought into position for aiming during step 510. Again, the exact actions preformed here will depend upon the degree of automation that is installed in the system. Fully automated systems will see the data calculated at control system 208, followed by movement instructions being fed to appropriate actuation means, such as stepper motors of the like, which in turn bring beamsetter 204 into position for performing aiming. More manual systems would accomplish the same result by indicating movement requirements to an operator.

Finally, at step 512, headlamp 101 is actually aimed. The fully automated system illustrated in FIG. 2 accomplishes this result with no operator intervention, with beamsetter 204 communicating information about the actual location of the headlight beam to control system 208. There, movement instructions would be calculated and movement data forwarded to aiming system 210. Beamsetter 204 would then reevaluate the beam aiming, and it would signal to control system 208 accordingly. That process would iteratively continue until the headlight beam was completely aimed. Semi-automatic or fully manual systems would accomplish the same result through operator intervention.

As described above, aiming process 500 would be applied sequentially to all headlamps of a vehicle requiring aiming. At the conclusion of all required iterations, the vehicle headlamps 101 would be precisely and independently aimed, fully meeting applicable regulations.

The specification sets out a number of specific exemplary embodiments, but those skilled in the art will understand that variations in these embodiments will naturally occur in the course of implementing the subject matter of the disclosure in specific environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

We claim:

1. A vision-based method for aiming a vehicle headlamp, comprising:
    scanning the headlamp with a vision system to identify the headlamp optical axis indicia;
    determining at least the height of the headlamp optical axis based on the location of the optical axis indicia;
    positioning a beamsetter in alignment with the headlamp optical axis, based at partially on the determined height; and
    aiming the headlamp with the beamsetter.

2. The method of claim 1, further comprising communicating the headlamp optical axis indicia location information to a control system.

3. The method of claim 1, further comprising communicating the headlamp optical axis indicia location information to a beamsetter.

4. A vision-based method for aiming a vehicle headlamp, comprising:
    positioning a vision system in front of the headlamp;
    scanning the headlamp with a vision system to identify the headlamp optical axis indicia;
    communicating the headlamp optical axis indicia location information to a control system;
    determining at least the height of the headlamp optical axis based on the location of the optical axis indicia;
    positioning a beamsetter in alignment with the headlamp optical axis, based at partially on the determined height; and
    aiming the headlamp with the beamsetter.

5. The method of claim 4, wherein the scanning step includes applying pattern recognition to identify the headlamp optical axis indicia.

6. The method of claim 4, wherein left and right side headlamps are sequentially and independently aimed.

7. A headlamp aiming system for a vehicle, comprising:
- a control system for receiving, communicating, and processing data;
  - a vision system configured to identify an optical axis reference mark on the headlamp, the vision system including a camera;
- a beamsetter, operatively connected to the control system, including:
  - a processor configured to exchange data with the control system; and
  - an optical system configured for providing information for aiming the headlamp.

8. The system of claim 7, wherein the headlamp beamsetter is photometric.

9. The system of claim 7, further comprising means for positioning the vision system and the beamsetter in front of the headlamp.

\* \* \* \* \*